Jan. 24, 1928.

B. EMIS 1,657,351

HEAT DISTRIBUTOR FOR KITCHEN BOILERS

Filed May 28, 1927

INVENTOR
Benjamin Emis
BY
ATTORNEY

Patented Jan. 24, 1928.

1,657,351

UNITED STATES PATENT OFFICE.

BENJAMIN EMIS, OF NEW YORK, N. Y., ASSIGNOR TO AMES-MYERS COMPANY, A CORPORATION OF MASSACHUSETTS.

HEAT DISTRIBUTOR FOR KITCHEN BOILERS.

Application filed May 28, 1927. Serial No. 194,931.

This invention relates to a heat distributor adapted to be placed under receptacles containing food material, liquids and the like, and intervening between such receptacles and the source from which the heat is derived for cooking the contents thereof, the principal object being to prevent the burning, or scorching of the said contents.

A further object of the device is a means to graduate the air spaces under the said receptacles, from a high point near to the outer margin of the distributor, to a low point at the center thereof, thus providing for the passage of a greater degree of heat through the thin central portion, which heat gradually diminishes toward the outer parts.

These and other objects and features of the device will be found fully described in the following specification and illustrated in the accompanying drawings, in which.

Figure 1:
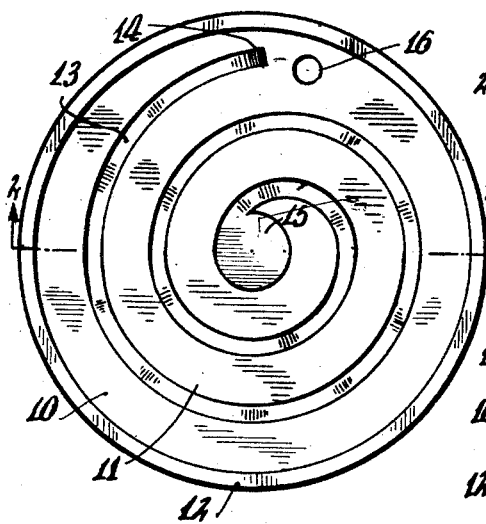
Fig. 1 shows a top view of the distributor in its simplest form.
Figure 2:
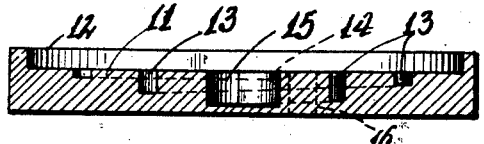
Fig. 2 shows a section thereof on the line 2—2 of Figure 1.

Referring now, to Figures 1 and 2 of the drawings, the device is here shown as a circular plate 10, which, while preferably of porcelain or aluminum, may be of any suitable material. This plate has a top surface 11 and a guard rim 12 around its outer edge. A groove, or channel 13, beginning at the surface of the plate at the point 14, gradually sinks to its lowest depth at the point of its termination in the center recess 15. A hole 16 is provided for hanging the plate on a hook, or the like when not in use.

It will now be seen that the greatest open area of the plate is at the central portion, and that this portion is also relatively thin as compared to the outer parts of the device. The heat is therefore delivered in its greatest volume under the center of the cooking container which is set over it; which causes, in the case of liquids, a circulation moving up from the center and downward at the sides, thus more quickly and throughly heating the whole; while, in the case of solid materials, the heat passes upward and radiates from the center of the mass, thus heating it throughly. The rim 12 prevents the possible slipping off of any pot, or boiler which may be placed on the plate.

Figure 3:
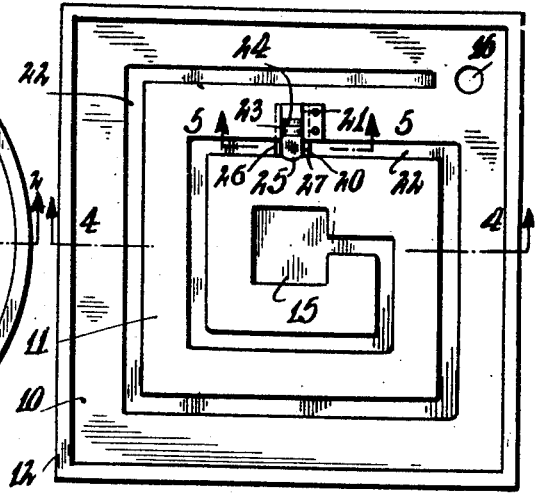
Fig. 3 shows another form of the invention, in which is provided a shut-off gate in the channel groove.
Figure 4:
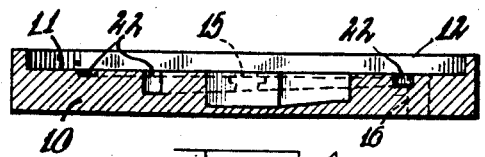
Fig. 4 shows a section on the line 4—4 of Figure 3.
Figure 6:
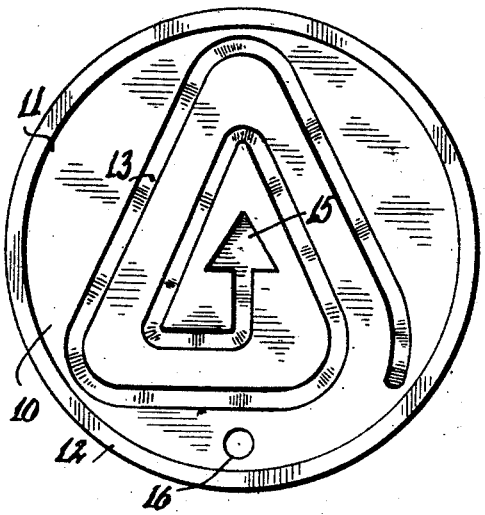
Fig. 6 shows a form of the device having a triangular arrangement of the channel grooves.
Figure 5:
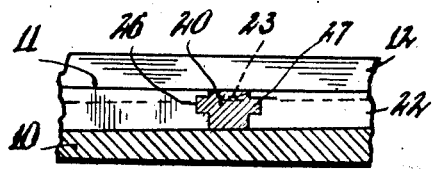
Fig. 5 shows an enlarged fragmentary section on the line 5—5 of Figure 3.

In Figures 3 and 4 is shown a modification of the device, which, while shown in square form, may be of any suitable shape. Its general construction is the same as that first described. It is further provided, however, with a shut-off gate 20 which operates in the groove 21 and may be slid forward as illustrated, to close the channel 22 which is the equivalent of that first shown at 13. A recessed portion 23 permits of moving the gate by the end lip 24. The forward end of the gate engages the seat recess 25. On reference to Figure 5, T slots 26 and 27 may be seen which serve to retain the gate in position. The curve of the recess 23 is here indicated by the dotted line so numbered. This gate may be used to shut off the outer parts of the channel 22 to prevent any spilled over liquid from running down the incline of the said channel and collecting at the center of the distributor. When solids are in course of preparation, it may be left open.

Having thus described my invention, what I claim as new and desire to secure by Letters Patent, is as follows:

1. In a heat distributor, a plate of suitable form, and a channel in the said plate, which channel is so disposed, that winding about itself it passes from a point near to the outer margin of the said plate to a point of termination in a recess at the center thereof, the depth of the said channel varying gradually from its point of beginning, which is relatively high with respect to the said plate, to its point of termination which is low with respect thereto.

2. In an article of the class described, a flat plate of suitable form, an upward disposed guard rim around the outer edge of same, and a channel sunk into the said plate and having its outer end beginning at a point relatively high with respect to the body of the plate, and its depth gradually increased throughout its length to its point of termination in a recess at the center of the said plate.

3. In an article of the class described, a flat plate of suitable form, an upward disposed guard rim around the outer edge of same, and a channel of varying depth beginning at a point relatively high with respect to the body of the said plate, and having its point of termination low with respect thereto, the said channel so disposed that its high end is located near to the outer margin of the plate and its course from that point winding within itself to the said point of termination, and a central recess opening into the said channel and its bottom at a point not above the deepest portion thereof.

4. In a heat distributor, a flat plate, a marginal, upward disposed continuous rim thereon, a central recess in the said plate having a bottom area which is relatively thin with respect thereto, a channel sunk into the body of the said plate and so disposed that its point of beginning is near to the outer margin thereof, and its course from that point winding about itself to a point of juncture with the said central recess, and its depth varying gradually from its point of beginning which is high, to its point of termination, which is low with respect to the body of the plate, and near to the outer margin of the distributor, a means for the suspension of the device.

5. In a heat distributor, a plate of suitable form, a channel in the said plate, which channel is so disposed, that winding about itself it passes from a point near to the outer margin of the said plate to a point of termination in a recess at the center thereof, the depth of the said channel varying gradually from its point of beginning which is relatively high with respect to the said plate, to its point of termination, which is low with respect thereto, and located adjacent to the said channel, a slidable gate having means to retain the same in position, and having its top surface flush with the face of the said plate and its forward portion adapted to be moved across the said channel and to effectively close it at this point, substantially as shown and described herewith.

In testimony whereof I have affixed my signature.

BENJAMIN EMIS.